INVENTOR.
Clement R. Tompson
BY John J. Pederson
Atty.

United States Patent Office 3,181,497
Patented May 4, 1965

3,181,497

TUNING INDICATOR

Clement R. Tompson, Melrose Park, Ill., assignor to Zenith Radio Corporation, Chicago, Ill., a corporation of Delaware Filed Nov. 21, 1963, Ser. No. 325,428
5 Claims. (Cl. 116—124.4)

This invention is directed to a tuning indicator for a wave-signal receiver and is particularly concerned with an indicator which presents a large illuminated indication of the station or frequency to which the receiver is tuned. While of general applicability the invention is of special value in a television receiver and of more particular value in a television receiver of the all-channel UHF-VHF type.

At the present time most television receivers are conditioned for the reception of video signals by means of a tuning mechanism activated by one or more tuning knobs or by a control mechanism as in remote control television receivers. In the United States the Very High Frequency (VHF) band which actually is two bands one extending from 54 to 88 megacycles per second and the other from 174 to 216 megacycles, was originally allocated for television broadcasting. Later an additional segment in a completely different area of the frequency spectrum, namely the Ultra High Frequency (UHF) band extending between 470 and 890 megacycles per second, was allocated for television broadcasting, The frequency spectra allocated for television broadcasting are subdivided into six megacycle ranges or channels for signal broadcasting. There are 12 channels in the VHF band and an additional 70 channels in the UHF band, for a total of 82 possible broadcast channels. The difficulties in constructing a tuner and tuning indicator to cover these widely separated frequency segments is self-evident. A common practice, heretofore, was to construct television receivers with 12 detented tuner knob positions for selection of any of the 12 VHF channels and with additional provisions for an auxiliary UHF tuner mechanism which could be added as desired. Obviously this approach is costly and frequently adds undesirably to space requirements of the receiver. With the advent of the more compact slim or portable models, space considerations have become even more critical. The problem of providing a compact and economical tuning indicator and mechanism has become acute with the recent requirement of the Federal Communications Commission that new television receivers have the capacity of selecting all channels in the UHF and VHF bands.

For complete utilization of the entertainment value of the modern large-screen television receivers, the viewer should be positioned a considerable distance from the screen. Because of space considerations most present VHF television receivers provide for small indicia of only approximately ¼ inch in height. Obviously with such small indicia it would be difficult for the viewer, located some distance away, to determine the channel to which his receiver is tuned. Some present receivers have overcome this difficulty for the VHF band by increasing the size of the indicia seen by the viewer by projecting light through transparent areas located on a mask coupled to the tuner, onto a screen located on a knob or otherwise at the front of the receiver. In one embodiment of this type, a mask with transparent indicia approximately ¼ inch in width are arranged about the outer surface of a hollow conical shaped tuning knob with the translucent screen located at the wide base of the knob which faces outward from the receiver. A light source is positioned inside the cabinet to project through the transparent areas of the mask onto the screen. Such a construction for an all-channel tuner would have a circumference of approximately 20 inches and a diameter of approximately 7 inches. Obviously this would be impractical.

An additional limitation of previous constructions of projection type tuning indicators lies in the fact that the effective viewing angle of such indicators is directly related to the strength of the light source and inversely related to the translucency of the screen, that is, for a given light source considerable brightness must be sacrificed to provide for a large viewing angle of the indicia.

Accordingly it is a principal object of the invention to provide a new and improved illuminated tuning indicator for a wave-signal receiver which provides a direct indication of the station or frequency to which the receiver is tuned.

It is another object of this invention to provide a compact easily readable tuning indicator which can cover an extended and segmented frequency spectrum.

It is a corollary object of the invention to provide a new and improved illuminated tuning indicator for a television receiver and especially for all-channel UHF-VHF television receivers.

It is another corollary object of the invention to provide a novel illuminated tuning indicator construction of small and compact size for television receivers and especially for all-channel UHF-VHF television receivers.

It is an object of the invention to provide a new and improved illuminated tuning indicator with a substantially wider viewing angle than prior indicators affording comparable brightness.

It is a further object of the invention to provide a new and improved tuning indicator which is simple and expedient to assemble and economical to manufacture.

In accordance with the invention, a tuning indicator for a wave-signal receiver including a cabinet and a frequency-selective tuning mechanism comprises a translucent screen on the cabinet. Also provided within the cabinet is an astigmatic light source disposed and supported therein at an orientation to project such light upon the screen. A mask with a plurality of transparent areas arranged in a predetermined pattern is movably mounted within the cabinet between the light source and the screen in a position to selectively allow light from the astigmatic light source to be projected through the transparent areas, and means are provided for coupling the mask to the frequency-selective tuning mechanism.

The features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements, and in which:

Figure 1:
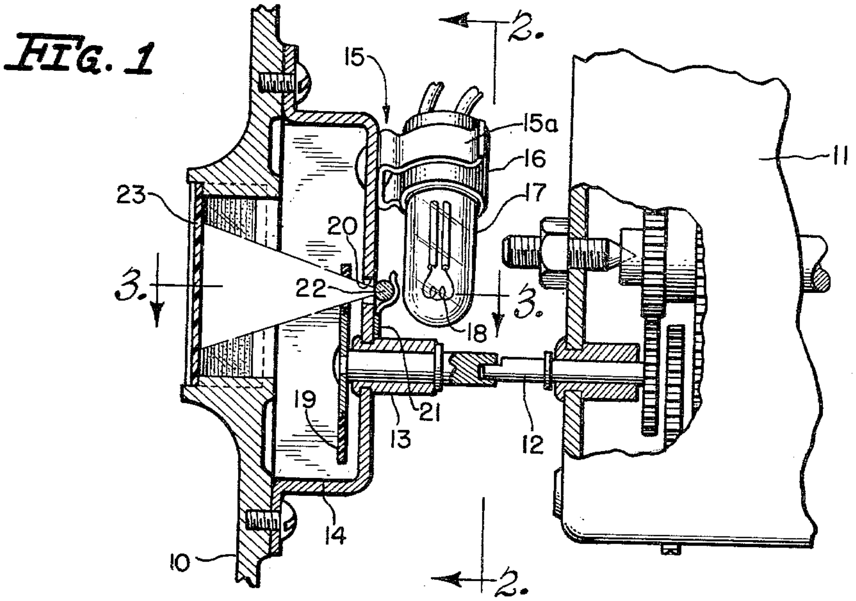
FIGURE 1 is a fragmentary side elevational view, partly in cross-section, of a tuning indicator embodying the invention.

Referring now more particularly to FIGURE 1, a tuning indicator for an all-channel UHF-VHF television receiver is mounted on a television cabinet 10, only a small portion of which is shown. Inasmuch as the invention is not directly concerned with the operative electrical circuits of the receiver or the general construction of the cabinet, it has been deemed necessary to show only those structural elements needed for an understanding of the invention.

The receiver includes a tuning mechanism 11 in which the entire UHF-VHF broadcast frequency range may be covered with a single rotation of a tuning knob. A shaft 12 may be axially connected to the tuning knob of the receiver or otherwise coupled to rotate 360 degrees as the tuning mechanism is tuned through its range. Shaft 12 extends between tuning mechanism 11 and a bearing sleeve 13 which may be a part of light shield 14. Also affixed to shield 14 is a bracket 15 in which a socket 16 contains a light source comprising an electric bulb 17. Bracket 15 is pivotally affixed to shield 14 to provide for angular adjustment in a vertical plane parallel to shield 14. Bracket 15 holds socket 16 by means of spring metal clip members 15*a* and 15*b* to permit rotational and longitudinal adjustment of the position of socket 16 and bulb 17. Bulb 17 may be of any common type but it is preferably of a type provided with an approximately linear filament 18. Common bulbs having low initial cost and long life, such as the universal 1847 pilot light, are entirely adequate for use as a light source in the preferred embodiment. The use of such an economical light source constitutes an advantage of the invention over many prior projection type tuning indicators which require more expensive bulbs.

In accordance with the invention, a circular mask 19 is affixed to shaft 12 near shield 14. Mask 19 is provided with spaced transparent areas of predetermined patterns, preferably numerical, which define indicia corresponding to the various possible tuning conditions of tuning mechanism 11. As described in detail later, the indicia may be placed quite close to each other and may be of quite small size. In a preferred embodiment all 12 VHF channel indicia as well as fourteen indicia representing every fifth channel of the UHF range were placed about the circumference of a circular mask approximately 1.5 inches in diameter. The indicia were approximately ⅛ inch in height and width.

Figure 2:
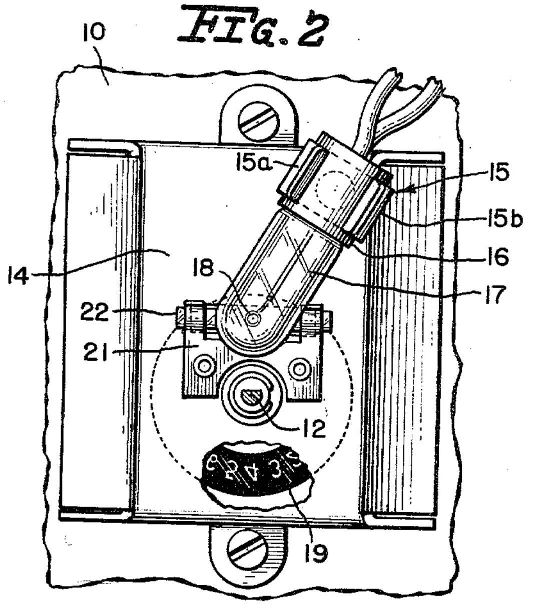
FIGURE 2 is a rear elevational view, partly in cross-section, taken along the line 2—2 of FIGURE 1.

Shield 14 is provided with an aperture or slit 20 of a generally rectangular shape with a length dimension several times its width dimension. Slit 20 lies in a horizontal plane and is aligned with the locus of the indicia with rotation of mask 19, as may be seen in FIGURE 2. Affixed to shield 14 near slit 20 is a mounting bracket 21 for holding a cylindrical lens 22 in close juxtaposition with slit 20.

Figure 3:
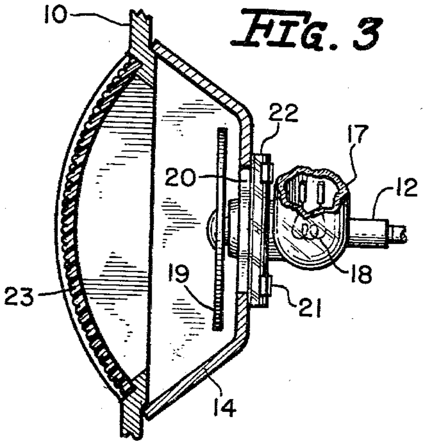
FIGURE 3 is a plan view, partly in cross-section, taken along the line 3—3 of FIGURE 1.

An image projection screen 23 is mounted on cabinet 10 in alignment with lens 22, slit 20 and a portion of mask 19. Screen 23 is made of a material having optical transmission properties such as plastic or glass. It has its inner surface "frosted," that is, treated to form a translucent surface upon which an image may be formed by the projection of light. In its overall shape, screen 23 is curved to form a segment of a cylinder. The radius of curvature of the cylinder preferably corresponds to its distance from filament 18, as shown in FIGURE 3.

Screen 23 may also be made concave in the vertical plane with a radius of curvature equal to the distance between the screen and the apparent light source seen from the screen 23 in the vertical plane. Such a construction, while more complex to fabricate, is useful in applications in which the greatest degree of image sharpness is required. In the primary field of application of the invention, however, as a channel indicator for a television receiver, the simpler cylindrical configuration provides illuminated channel indications of ample sharpness and clarity.

The outer or viewing surface of screen 23 is ribbed to form a plurality of approximate semicylindrical lenses. In cross-section, as may also best be seen in FIGURE 3, the viewing surface has a generally cycloidic configuration. Screen 23 may be formed of tinted material to form a light filter for increasing the contrast of the indicia as will be explained later. Light shield 14 is preferably formed to completely encompass screen 23, so that the only light having access to the screen is that originating at filament 18 and projected through lens 22.

In operation, filament 18 of bulb 17 is oriented by longitudinally and rotationally adjusting socket 16 in bracket 15 and by rotating bracket 15 so as to have one end of filament 18 facing into lens 22 normal to slit 20 as shown in FIGURE 1. Once properly oriented bulb 17 is left undisturbed. However, should the bulb become dislocated from the position mounting bracket 15 it is easily relocated by the user. The filament is aligned with its end pointing into lens 22 to reduce its apparent size, as seen by lens 22, so as to approximate a point source of light and thereby minimize distortion on the image projected. In ordinary operation, light admitted from the approximate point source of filament 18 passes through cylindrical lens 22 and slit 20 and through the transparent areas of mask 19 to project indicia onto screen 23. As the tuning mechanism is adjusted to receive different frequencies or channels, coupling shaft 12 rotates mask 19 to bring other indicia before the light radiating from cylindrical lens 22 and thereby change the indicia projected on screen 23.

In accordance with the invention, the light projected through mask 19 is astigmatic. The light when viewed from mask 19 in a plane parallel to cylindrical lens 22 has an apparent source of center of dispersion located approximately at the true light source which is filament 18. However, when viewed from the mask in a plane perpendicular to cylindrical lens 22 the apparent light source or apparent center of dispersion is considerably closer to the mask. When viewed in any of the intermediate planes the light source or center of dispersion appears to be at points between these two positions. The effect of the astigmatic light source comprising bulb 17 and lens 22 on the indicia projected from mask 19 is to spread the indicia more in the plane perpendicular to the axis of cylindrical lens 22.

Figure 4:
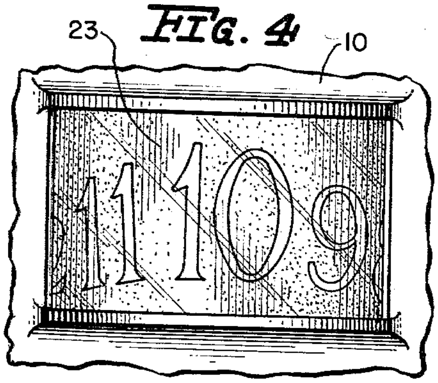
FIGURE 4 is a front elevational view of the device of FIGURE 1 showing some internal parts in dashed outline.

With this construction, several indicia are simultaneously projected on the generally rectangular screen 23 for each adjustment or setting of tuning mechanism 11, as shown in FIGURE 4. The particular shaping of screen 23 produces the effect depicted in FIGURE 4. As shown the central indicium is considerably larger than the other indicia, and these latter indicia are of decreasing size towards the edge of screen 23.

As the light from mask 19 reaches the inner surface of screen 23 it forms an image of certain correlated indicia thereon. The light from the image passes through screen 23 and is dispersed from its ribbed outer surface. It is there dispersed by the semi-cylindrical lenses formed on the surface in a wide angle in the horizontal plane. The semi-cylindrical lenses have the effect of dispersing light primarily horizontally, but without so spreading the projected image in the vertical plane. In this manner, the horizontal viewing angle is substantially increased without substantial sacrifice in brightness.

Screen 23 may also be constructed to serve as a light-filter by tinting the material between the inner and outer surfaces of the screen. By so tinting screen 23, the contrast between the projetced light from the indicia and the reflected ambient light from the unilluminated portions of screen 23 is materially increased. The filter placed before the screen has the effect, while reducing the brightness of the indicia, of reducing the brightness of the ambient light falling on screen 23 from without cabinet 10 by a factor equal to the square of the reduction of the image brightness, since the ambient light must pass through the filter twice, once to reach the screen and again on reflection. For example, a 50% transmission filter decreases the reflected ambient light by 75% while reducing the projected image brightness only 50%. This is an increase in the relative brightness or contrast, of 200%.

As tuning mechanism 11 is adjusted to selected different frequencies, shaft 12 rotates mask 19 to present different indicia across cylindrical lens 22. The appearance on screen 23 is a single indicium rotates across cylindrical lens 22 is that the image first appears at one edge of the screen in a relatively small height, gradually increases in size as it approaches the center, and then declines in size until passing off the screen. Such a tuning indication presents the viewer with a pleasing "slide-rule" type representation of the part of the frequency spectrum to which the receiver is tuned while the specific channel adjustment of the tuning mechanism is indicated by both the emphasized size and the central location of the corresponding channel number or other designation.

Should the particular application require that additional indica be represented or that the size of the mask be reduced, lens 22 may be oriented vertically rather than horizontally to provide for greater dispersion of the image of the indicia from one another in the horizontal plane. With this orientation the indicia of mask 19 may be made more narrow and placed closer together to provide for a greater number of indica on a smaller mask. Such an indication is particularly useful in conjunction with an all channel UHF-VHF tuner of the type described and claimed in the above-identified Bell application, in which automatic frequency control is employed for electronic fine tuning and only an approximate manual tuner adjustment is required.

The construction described is simple and economical to manufacture. It has the additional advantage of adding only a small additional torque or load to the tuning mechanism while providing a unique, pleasing and informative visual representation of the tuning condition of the receiver.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A tuning indicator for a wave-signal receiver including a cabinet and a frequency-selective tuning mechanism, said indicator comprising:
- an image projection screen on said cabinet;
- an astigmatic light source disposed within said cabinet near said screen and supported therein at an orientation to project astigmatic light upon said screen;
- a mask with a plurality of transparent areas arranged in a predetermined pattern, movably mounted within said cabinet between said astigmatic light source and said screen in a position to selectively allow light from said astigmatic light source to be projected upon said screen through said transparent areas;
- and means for coupling said mask to said frequency selective tuning mechanism.

2. A tuning indicator for a wave-signal receiver including a cabinet and a frequency-selective tuning mechanism, said indicator comprising:
- an outwardly curved translucent image projection screen on said cabinet;
- an astigmatic light source disposed within said cabinet near said screen and supported therein at an orientation to project astigmatic light upon the inner surface of said screen, said light source comprising a generally cylindrical lens in juxtaposition with an approximate point light source;
- a mask with a plurality of transparent areas arranged in a predetermined pattern, movably mounted within said cabinet between said astigmatic light source and said screen in a position to selectively allow light from astigmatic light source to be projected upon said screen through said transparent areas;
- and means for coupling said mask to said frequency selective tuning mechanism.

3. A tuning indicator for a wave-signal receiver including a cabinet and a frequency-selective tuning mechanism, said indicator comprising:
- an image projection screen on said cabinet with said screen having a viewing surface with means for dispersing light projected on said screen primarily in one viewing plane;
- an astigmatic light source disposed within said cabinet near said screen and supported therein at an orientation to project astigmatic light upon said screen, said light source comprising a generally cylindrical lens in juxtaposition with an approximate point light source;
- a mask with a plurality of transparent areas arranged in a predetermined pattern, movably mounted wherein said cabinet between said astigmatic light source and said screen in a position to selectively allow light from said astigmatic light source to be projected upon said screen through said transparent areas;
- and means for coupling said mask to said frequency selective tuning mechanism.

4. A tuning indicator for a wave-signal receiver including a cabinet and a frequency-selective tuning mechanism, said indicator comprising:
- a translucent image projection screen on said cabinet concave with respect to said cabinet, said screen having a generally cycloidic outer viewing surface forming a plurality of generally parallel semi-cylindrical lenses;
- an astigmatic light source disposed within said cabinet near said screen and supported therein at an orientation to project astigmatic light upon the inner surface of said screen, said light source comprising a generally cylindrical lens in juxtaposition with an approximate point light source;
- a mask with a plurality of transparent areas arranged in a predetermined pattern, movably mounted within said cabinet between said astigmatic light source and said screen in a position to selectively allow light from said astigmatic light source to be projected upon said screen through said transparent areas;
- and means for coupling said mask to said frequency selective tuning mechanism.

5. A tuning indicator for wave-signal receiver including a cabinet and a frequency-selective tuning mechanism, said indicator comprising:
- an outwardly curved translucent image projection screen on said cabinet, said screen having a predetermined radius of curvature and a generally cycloidic outer viewing surface forming a plurality of generally parallel semi-cylindrical lenses to disperse light projected on said screen primarily in a predetermined plane;
- an astigmatic light source disposed within said cabinet near said screen at a distance approximately equal to said radius of curvature from said screen and supported therein at an orientation to project astigmatic light upon the inner surface of said screen, said light source comprising a generally cylindrical lens in juxtaposition with an approximate point light source;
- a mask with a plurality of transparent areas arranged in a predetermined pattern, movably mounted within said cabinet between said astigmatic light source and said screen in a position to selectively allow light from said astigmatic light source to be projected upon said screen through said transparent areas;

and means for coupling said mask to said frequency selective tuning mechanism.

References Cited by the Examiner

UNITED STATES PATENTS

| | | | |
|---|---|---|---|
| 1,860,151 | 5/32 | Mapelsden | 116—124.4 |
| 2,103,333 | 12/37 | McWeeny | 116—124.4 |
| 2,191,045 | 2/40 | Slayton | 116—116 |
| 2,678,621 | 5/54 | Proctor | 116—124.4 |
| 2,681,634 | 6/54 | Polley | 116—124.4 |
| 2,823,639 | 2/58 | Vistain et al. | 116—124.4 |
| 2,834,250 | 5/58 | Stefani | 88—24 |
| 2,907,298 | 10/59 | Steinke | 116—124.4 |
| 2,983,248 | 5/61 | Steinke | 116—124.4 |
| 3,029,772 | 4/62 | Tompson | 116—124.4 |
| 3,045,542 | 7/62 | Finkelstein | 88—24 |

LOUIS J. CAPOZI, *Primary Examiner.*